United States Patent Office 2,849,875
Patented Sept. 2, 1958

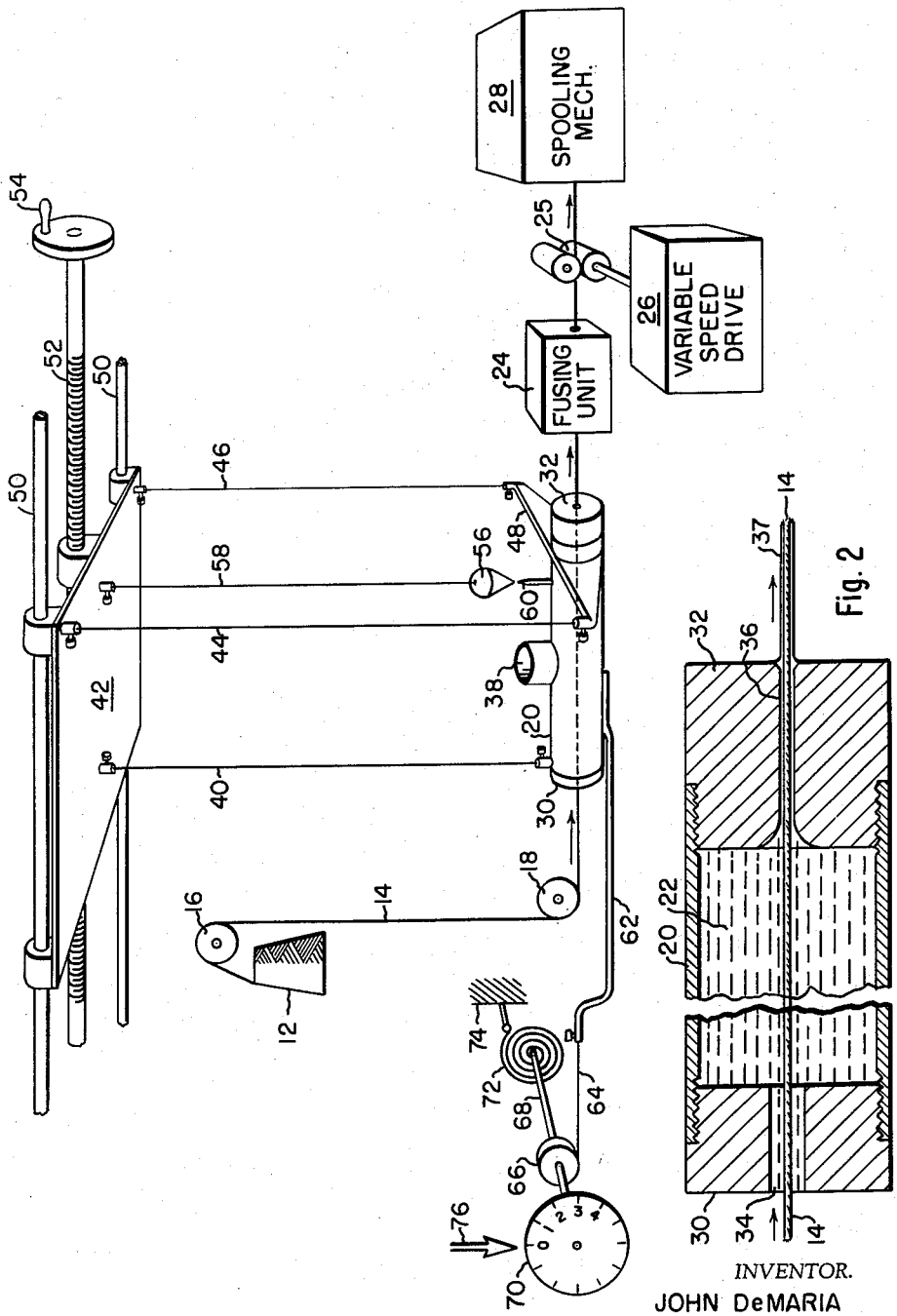

2,849,875

APPARATUS FOR MEASURING THE VISCOSITY OF A COATING LIQUID

John De Maria, Rehoboth, Mass., assignor to Chemical Products Corporation, East Providence, R. I., a corporation of Rhode Island Application January 29, 1957, Serial No. 636,894

7 Claims. (Cl. 73—54)

The present invention relates generally to apparatus for measuring the coating properties of a liquid, and more particularly to testing apparatus sensitive to the viscosity of liquids.

Developments in the field of chemical engineering are constantly increasing the choice of coating formulations available for imparting desired qualities to a multitude of articles of manufacture. The viscosity of the coating liquid largely determines its suitability for coating. In terms of viscosity, the coating formulations cover a very large range, including some formulations with consistencies of the order of molasses. A characteristic application of coating techniques with higher viscosity formulations is the coating of various articles with liquid plastisol.

Because many coating liquids such as plastisols are suspensions rather than true liquids, their viscosities may vary with the rate of shear strain, in which case the relevant viscosity is that which exists at the desired velocity of coating in actual production. The influence of viscosity on the thickness and uniformity of the coating at given speeds of application is well illustrated in the high-speed manufacture of plastisol-coated fiberglas yarns for woven insect screening or the like. The finished plastisol coating is ordinarily as thick or thicker than the diameter of the fiberglas yarn to which it is applied. This calls for a formulation of considerable viscosity, and defines a critical relationship between the speed of application and the viscosity for a desired thickness and uniformity of coating.

In view of the importance of the viscosity of a liquid in determining its suitability for coating, it is a principal object of this invention to provide testing apparatus adapted to measure viscosity. Such apparatus is a valuable adjunct either to manufacturing facilities for preparation of coating formulations or to facilities for applying the coating to the goods.

It is apparent, moreover, that in addition to viscosity, there are other physical and chemical properties of a coating liquid that influence its suitability in production to a greater or lesser extent. These include, for example, adhesiveness to the object to be coated and surface tension. Accordingly, a further object is to provide apparatus adapted to test the liquid under conditions simulating production, that is, standardized conditions in which all of these properties are operative substantially as in production. By this means, the test results for a formulation found by experience to be optimum become a reliable standard for quality control of each new batch to be manufactured.

A more specific object of the invention is to provide testing apparatus for very accurate evaluation of the overall suitability of a liquid for coating yarn or wire under conditions that faithfully reproduce those existent in actual production.

With the above and other objects in view, the features of the invention are embodied in a viscosimeter, including a cylinder having openings at each end and adapted to be filled with coating liquid, adjustable speed means to draw a yarn or wire through the openings and cylinder, and means to measure the reaction of the cylinder upon the liquid.

Other features of the invention reside in the various features of construction, combinations and arrangements of the parts, and modes of operation as hereinafter more fully described, having reference to the appended drawing illustrating a preferred embodiment thereof, in which Fig. 1 is an oblique pictorial view, partly in diagrammatic form, illustrating the viscosimeter; and Fig. 2 is a side elevation in section of the coating cylinder showing details of the entrance and exit dies.

Referring to the drawings, there is provided a spool 12 having thereon a yarn 14 to be covered with a coating material to be tested. It will be understood that wire may be used in place of the yarn. The yarn may be of any desired material, for example cotton, wool or other natural fiber, glass, metal or synthetic compositions. The yarn is passed over pulleys 16 and 18, through a hollow metal cylinder 20 filled with the coating material 22, through a fusing unit 24 to dry or harden the coating, and through the bite 25 of a variable speed friction drive 26 to spooling mechanism 28.

The cylinder 20 is fitted at one end with an entrance die 30 and at the other end with an exit die 32. Fig. 2 is a side elevation in section of the cylinder 20 showing details of the entrance and exit dies. The die 30 has a hole 34 to receive the yarn 14 with example clearance. Ordinarily, this clearance is great enough to allow the liquid 22 to leak out of the cylinder around the yarn when the latter is stationary. The die 32 has a hole 36 of a diameter smaller than that of the hole 34 but greater than that of the yarn, and is designed to strip off all but the desired thickness of the coating material. The yarn is thus drawn from the cylinder with a coating 37.

The cylinder 20 is also provided with a vertical tubular extension 38 which is used to fill the cylinder above the level of the holes 34 and 36 with the coating liquid to be tested.

The cylinder 20 is supported by a three-point suspension including a chain 40 secured at its upper end to a rigid metal carriage 42 and two chains 44 and 46 secured at their upper ends to the carriage 42 and at their lower ends to a rigid yoke piece 48 rigidly secured at its midpoint to the cylinder 20. The three chains are secured to the carriage and cylinder so as to hang as closely plumb and parallel as possible with the axis of the cylinder perfectly horizontal.

The carriage 42 is slidably supported on fixed guide rods 50 parallel with the axis of the cylinder 20. The position of the carriage on the rods is adjustable by means of a lead screw 52 turned by a crank 54.

A plumb bob 56 is suspended by a chain 58 from the carriage 42 so that it hangs directly opposite a fixed pointed projection 60 securely fixed to the cylinder 22 when the suspension chains 40, 44 and 46 are plumb. This position of the bob indicates the absence of components of force on the suspension chains longitudinal to the axis of the cylinder 20. A rigid rod 62 is secured at one end to the outer wall of the cylinder 20 and at the other end to a flexible wire or string 64 extending over a pulley 66. The application of tension to the flexible string or wire 64 causes it to be suspended exactly in the extension of the longitudinal axis of the cylinder 20.

The pulley 66 is securely fastened to a shaft 68, upon which is also secured a calibrated scale disk 70 and one end of a torsion spring 72. The other end of the spring is secured to the fixed frame 74 of the apparatus. A pointer 76 is also held in fixed position with reference to the frame of the apparatus.

The yarn 14, after being stripped of excess coating by the exit die 32, enters a fusing unit which, as previously indicated, is designed to harden or "dry" the coating 37 so that it may be taken up upon a spool. The adjustable speed drive 26 determines the linear speed of the yarn as it passes through the cylinder 20.

The holes 34 and 36 in the entrance and exit dies are substantially larger than the yarn drawn therethrough, so that the resistance to movement of the yarn 14 through the cylinder arises essentially from the shearing stresses imparted to the liquid by the yarn. The reaction of the liquid to these stresses is transmitted to the cylinder 20, which in turn is urged in the direction of motion of the yarn. Assuming that the suspension chains are plumb, as illustrated, when the variable speed drive is stopped, the rotation of this drive at a constant speed causes the cylinder 22 to move a fixed corresponding distance in the direction of travel of the yarn, this distance being such that the resultant longitudinal components of tension in the suspension chains 40, 44 and 46, when added to the resultant tension in the wire or string 64, substantially equal the tension in the yarn 14 between the exit die 32 and the bite 25 of the drive.

In order that the above tension in the yarn at the exit die may be measured upon the scale disk 70, it is first necessary to transfer all longitudinal components of tension in the suspension chains 40, 44 and 46 to the wire or string 64. This is done by rotating the crank 54 until the plumb bob 56 is directly opposite the projection 60, the variable speed drive 26 being held at constant speed throughout this adjustment. Following this adjustment, a reading upon the scale 70 proportional to the yarn tension at the exit die may be taken. The scale 70 may be calibrated in units of force in a conventional manner according to the rate of the spring 72. If a spring 72 of given stiffness is found to require a given linear adjustment in the position of the carriage 42 from the position illustrated for a liquid of given viscosity, a spring of less stiffness may be employed to require the same linear adjustment for a liquid of lower viscosity.

If desired, other scales may be calibrated upon the wheel 70. Thus for example, for a given apparatus the scale may read the shear stress directly in pounds per square inch. The viscosity is then readily computed as the shear stress divided by the rate of shear strain, this latter rate being proportional to the velocity of the yarn. In any event, since the apparatus is sensitive to viscosity, it may be calibrated by means of liquids of known viscosity.

By means of the above-described apparatus, it is possible to measure very viscous liquids. Moreover, the apparatus is particularly suited to testing the coating properties of formulations to be applied to yarn goods or wire, for example plastisol coatings for fiberglas yarns as mentioned above or enamels for electric wire. The peculiar advantages of the apparatus in such applications reside in the fact that the coating is applied to a sample length of the yarn or wire itself under conditions in which any significant factors in addition to viscosity which are present under production conditions are present in the test. The test results are an excellent index of coating suitability for objects of other shapes as well, however. That is, whatever the shape or other properties of the article to be coated, it is ordinarily found that a formulation having given properties as measured by the above apparatus produces optimum results.

It will be appreciated that various means may be provided in the apparatus for insuring that the tension on the string or wire 64 is equal to and opposite the tension on the yarn at the exit die 32 before a reading is taken upon the scale 70. As an alternative, this may be done by floating the cylinder 20 in a liquid, or adjusting the position of the fixed end of the spring 72 until the chains 40, 44 and 46 are plumb, rather than moving the carriage 42. In any case, it is important that the string or wire 64 lies in an extension of the axis of the cylinder 20 and that the yarn 14 lies in this axis when the reading is taken. The adjustment in the position of the carriage 42 insures that this condition is met.

From the foregoing, it will be appreciated that apparatus has been provided for measuring the viscosities and coang properties of liquids over a wide range of values under closely reproducible conditions. Also, while the foregoing description has specific reference to a preferred embodiment, various modifications including those suggested above may be made therein in accordance with skills already known to the art without departing from the spirit or scope of the invention.

Having thus described the invention, I claim:

1. Apparatus for measuring the viscosity of a liquid including, in combination, a container to hold a supply of the liquid, said container having entrance and exit openings, drive means to feed an elongated piece of material through the openings and container, means attached to the container to apply a force opposing that exerted by the drive means on the container through said piece and liquid, and means to indicate the value of said opposing force.

2. Apparatus for measuring the viscosity of a liquid including, in combination, a container to hold a supply of the liquid, said container having entrance and exit openings below the level of said liquid, drive means to feed an elongated piece of material through said liquid between the openings, means attached to the container to apply a force thereto opposing that exerted by the drive means on the container through said piece and liquid, and means to indicate the value of said opposing force.

3. Apparatus for measuring the viscosity of a liquid including, in combination, a container to hold a supply of the liquid, said container having entrance and exit openings to receive a length of yarn below the level of said liquid, drive means to pull the yarn through said container at a predetermined speed, means attached to the container to apply a force thereto equal and opposite that exerted by the drive means on the container through said yarn and liquid, and means to indicate the value of said opposite force.

4. Apparatus for measuring the viscosity of a liquid including, in combination, a container to hold a supply of the liquid, said container having entrance and exit openings to receive an elongated piece of flexible material below the level of said liquid, each opening having a substantial clearance around said material, drive means to pull the material through said container from the entrance opening toward the exit opening at a predetermined speed, means attached to the container to apply a force thereto equal and opposite that exerted by the drive means on the container through said material and liquid, and means to indicate the value of said opposite force.

5. Apparatus for measuring the viscosity of a liquid including, in combination, a container to hold a supply of the liquid, said container having entrance and exit openings to receive an elongated pieces of flexible material below the level of said liquid, each opening having a substantial clearance around said material, the clearance around the entrance opening being greater than that around the exit opening, drive means to pull the material through said container from the entrance opening toward the exit opening at a predetermined speed, means attached to the container to apply a force thereto equal and opposite that exerted by the drive means on the container through said material and liquid, and means to indicate the value of said opposite force.

6. Apparatus for measuring the viscosity of a liquid including, in combination, a container to hold a supply of the liquid, said container having entrance and exit openings to receive an elongated piece of material below the level of said liquid, suspension means to support the container, drive means to feed the material through the openings and container, means attached to the container to apply a force opposing that exerted by the drive means on the container through said piece and liquid, means to transfer any component of force in said suspension means along said piece to said opposing force applying means, and means to indicate the value of said opposing force.

7. Apparatus for measuring the viscosity of a liquid including, in combination, a container to hold a supply of the liquid, said container having entrance and exit openings to receive an elongated piece of material below the level of said liquid, a number of vertically supported tension members to suspend the container with said openings in a horizontal line, drive means to feed the material through the openings and container at a predetermined speed, means attached to the container to apply a force opposing that exerted by the drive means on the container through said piece and liquid, means to transfer any horizontal components of tension in said tension members to said opposing force applying means whereby said tension members are restored to plumb position, means to indicate the plumb position of said tension members, and means to measure and indicate the value of said opposing force.

References Cited in the file of this patent

UNITED STATES PATENTS

| | | |
|---|---|---|
| 1,614,565 | McWaid | Jan. 18, 1927 |
| 2,049,951 | Doan | Aug. 4, 1936 |
| 2,465,818 | Richardson | Mar. 29, 1949 |

FOREIGN PATENTS

| | | |
|---|---|---|
| 841,267 | France | Feb. 1, 1939 |

UNITED STATES PATENT OFFICE
CERTIFICATE OF CORRECTION

Patent No. 2,849,875                                  September 2, 1958

John De Maria

It is hereby certified that error appears in the printed specification of the above numbered patent requiring correction and that the said Letters Patent should read as corrected below.

Column 2, line 30, for "example" read -- ample --; column 4, line 9, for "coang" read -- coating --; column 4, line 59, for "pieces" read -- piece --.

Signed and sealed this 6th day of January 1959.

(SEAL)
Attest:

KARL H. AXLINE
Attesting Officer

ROBERT C. WATSON
Commissioner of Patents